United States Patent
Basson et al.

(10) Patent No.: US 7,672,999 B2
(45) Date of Patent: Mar. 2, 2010

(54) TRANSMITTING COMMON AND UNIQUE INFORMATION SELECTIVELY TO DIFFERENT RECIPIENTS

(75) Inventors: Sara H. Basson, White Plains, NY (US); Dimitri Kanevsky, Ossining, NY (US); Mariusz Sabath, Scarsdale, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 10/041,390

(22) Filed: Jan. 8, 2002

(65) Prior Publication Data

US 2003/0131057 A1 Jul. 10, 2003

(51) Int. Cl.
*G06F 15/16* (2006.01)
*G06F 15/173* (2006.01)

(52) U.S. Cl. .................. 709/206; 709/223; 709/225; 709/246

(58) Field of Classification Search ......... 709/204–207, 709/223–225, 229, 246
See application file for complete search history.

(56) References Cited

U.S. PATENT DOCUMENTS

| | | | |
|---|---|---|---|
| 6,192,396 B1 * | 2/2001 | Kohler | 709/206 |
| 6,247,045 B1 * | 6/2001 | Shaw et al. | 709/207 |
| 6,529,942 B1 * | 3/2003 | Gilbert | 709/206 |
| 6,549,935 B1 * | 4/2003 | Lapstun et al. | 709/204 |

* cited by examiner

*Primary Examiner*—Hussein Elchanti
(74) *Attorney, Agent, or Firm*—Ohlandt, Greeley, Ruggiero & Perle, L.L.P.; Daniel P. Morris, Esq.

(57) ABSTRACT

A system for enabling the transmission of a prepared message to multiple intended recipients, wherein the information contained in the message is substantially the same as received for all the recipients but differs in parts or portions for certain recipients comprising: a module containing the entire message which includes both the common and unique information to be transmitted and the instructions for selectively providing the information to different recipients; and scheme for sending together from the module all the parts or portions of the information to all recipients, but including means responsive to the instructions, for having selectively different parts or portions of the information received by the different recipients.

16 Claims, 4 Drawing Sheets

TRANSMITTING COMMON AND UNIQUE INFORMATION SELECTIVELY TO DIFFERENT RECIPIENTS

FIELD OF THE INVENTION

The present invention is related to the transmission and reception of messages in a variety of forms; e.g., from one computer to another and, in more particular cases, to the exposure of textual and visual data for viewers (for example, in e-mail notes and files on a computer screen).

BACKGROUND OF THE INVENTION

In order to provide some background and context for an appreciation of the present invention reference may be made to a related application assigned to the assignee of the present invention: Apparatus And Method For User Recognition Employing Behavioral Passwords Used For Identification (YO998-033) which was filed on May 15, 1998, application Ser. No. 09/079,754.

When a message is composed and sent to several people, part of the information may not be intended to be read by all of the recipients. There is already a known method, blind copy, that allows a user to copy a message to a recipient without others knowing who the recipient is, or even that the message was sent to another recipient. However, this technology does not take care of a situation where a person composes a message and several parts of the message are intended only for a particular recipient. In this case the user would have to compose several messages to account for the different parts intended for different recipients, and then send several different messages out to the recipients. This wastes time and resources. For example, suppose a message is sent to two people, and to one of them the author of the email writes "regards", and to the other "love". To accomplish this, the author must type two virtually identical e-mail messages with different endings.

SUMMARY OF THE INVENTION

Accordingly, it is a primary, general object of the present invention to fulfill the clear need for avoiding the waste of time and resources in repeatedly preparing substantially the same message directed to different recipients. Another object of the invention is to provide a method and system for providing multiple-viewing of a text by viewers.

More specifically, another object of the invention is an interface for a text producer to mark a text as to how it should be viewed by recipients (in e-mail notes).

Another object of the invention is a provision for providing the different portions of the text according to a confidentiality content and user confidentiality permission.

A further object of the invention is to utilize biometric means to confirm what level of text used for user identity can be displayed for the user. Such biometric means function to identify the user.

Yet another object of the invention are GUI (Graphical User Interface) that allows user to view how different users would see the prepared message/field for them.

Our invention proposes the flagging or identifying of separate segments of an email for reading by different recipients. For example, it is possible to flag a portion of a message in the left margin at the start of the desired phrase—Bcc: (name of the desired recipient(s)), so that the name next to the 'Bcc' will signify the person intended to read that segment of the email. In our example where one recipient is intended to receive the message with the "Best regards", while the other is to receive the message with the "Love", the format will look like the following: Justified to the left margin—'[bcc:Alex, Ariel] Best Regards', next line '[bcc:Jonathan] Love'. When 'Alex' receives the email he will read—Best Regards, while 'Jonathan' will read—Love. The user may also preview the email message to see the version that will be received by each particular user. The user can preview the message to see how Alex would see it and how Jonathan would see it.

The present method may also be used for more complex documents with more complicated characteristics. For example, a notice that is being sent through email is composed of different and possibly confidential notices. The entire message may be sent out and certain recipients would have different levels of security access and can respectively read different amount of the single notice. The persons with the highest level of confidentiality/security clearance will be allowed to read the entire message, while people with lower levels of security clearance will be allowed to read parts of the message. This may be done in the following manner. In a particular place in the message, the two (or more if multiple security levels are desired) types of people are identified with different symbols/identifiers. For example, before each name in the address box a label is placed noting their level of security/confidentiality—'C' can mean that the recipient has full permission to access confidential portions of the notice/message. 'NC' can mean that the recipient does not have permission to view confidential information in the email message. $C1, C2.Cn$ can symbolize relative amounts of security/confidentiality clearance for a recipient. The portions of the email message that are confidential can begin with a '[C:' and then finish with a ':C]' symbolizing the end of a confidential segment in the message. Only people with permission to access the confidential portions of the email (those with a C in the initial address box) will be allowed to access that portion of the email.

It is also possible, according to some parameter, to know whether particular content in a message will be interesting or of value to a recipient. The methodology of the email with confidential parts may be applied to more general situations where the recipient sees only parts of the email for reasons besides confidentiality. For example, it can be a description of some design or object with different levels of detailed analysis, where some user can read the entire analysis, while another user may have a brief summary of the description. This could be relative to the expertise of a professional vs. amateur reading about a given topic; or simply, one person happens to care a bit more about a subject and requires more information for research purposes than another person trying to understand the basics of that subject. This may be done by asking the recipient/user their level of professionally or interest in a subject prior to opening an article/message/or email.

Accordingly, the feature of the present invention may be briefly defined as follows: a system for enabling the transmission of a prepared message to multiple intended recipients, wherein the information contained in the message is substantially the same as received for all the recipients but differs in parts or portions for certain recipients comprising: a module containing the entire message which includes both the common and unique information to be transmitted and the instructions for selectively providing the information to different recipients; and means for sending together from the module all the parts or portions of the information to all recipients, but including means responsive to the instructions, for having selectively different parts or portions of the information received by the different recipients.

Another feature of the invention includes specific means for enabling multiple viewing of an e-mail message.

The foregoing and still further objects and advantages of the present invention will be more apparent from the following detailed explanation of the preferred embodiments of the invention in connection with the accompanying drawing.

DESCRIPTION OF PREFERRED EMBODIMENTS

Figure 1:
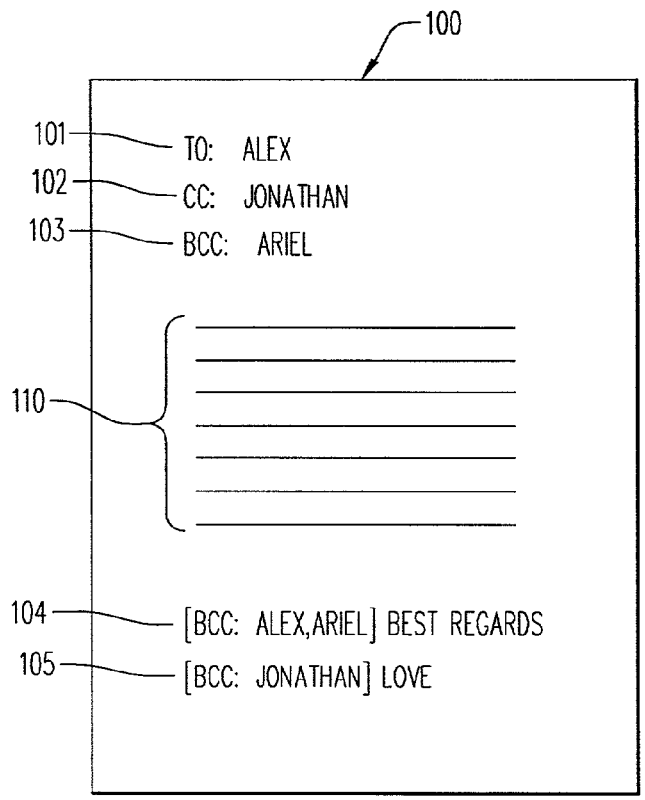
FIG. 1 gives an example of an email message
FIG. 2 gives a more complex example of a message with different levels of confidentiality

Referring now to the Figures of the drawing a detailed description of embodiments of the present invention are provided. Before proceeding with the description, the term "module" is defined as a medium having a portion for storing a message, per se, along with the instructions for the transmission of the same message in different forms, such as with different parts or portions, selectively flagged such that they will be provided, or not provided, to respectively different recipients.

FIG. 1 gives an example of an email message whose context is received and viewed in different amounts by different recipients. Module 100 represents the entire message. Module 101 notes that the message is to be sent to Alex. In module 102 the message is copied to Jonathan. In module 103 it is blind copied to Ariel, but other persons receiving the e-mail will not know that the message was copied to Ariel. The lines in the message, module 110, represent the textual content of the e-mail. Module 104 contains a link that says [Bcc: Alex, Ariel] Best Regards, this line will only be visible to Alex and Ariel. Module 105, [Bcc: Jonathan] Love, will only be visible to Jonathan.

Figure 2:
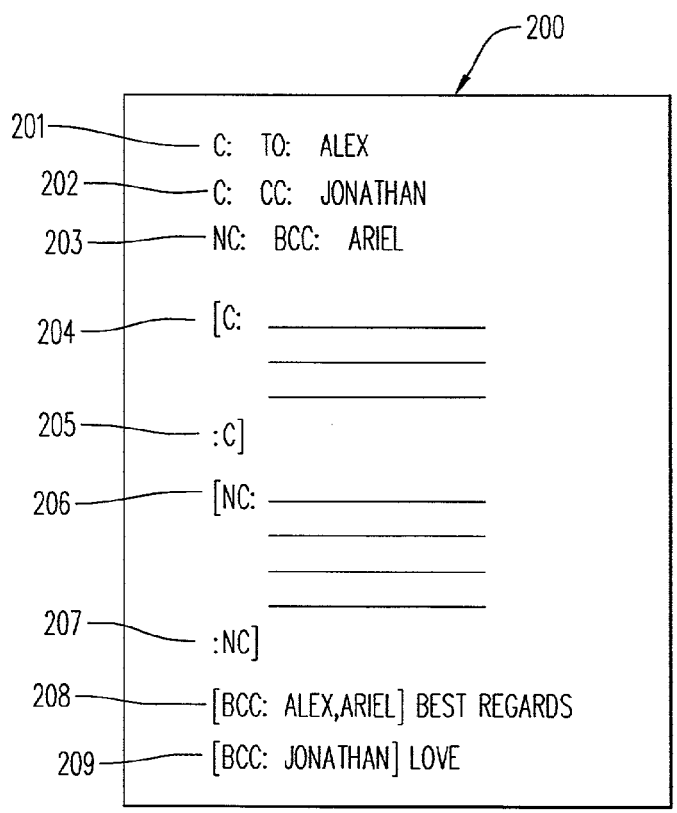

FIG. 2 gives a more complex example of a message with different levels of confidentiality access to portions of the message itself. Module 200 represents the entire message. In 201 the message is being sent to Alex, but the 'C:', signifies that Alex will be able to read the entire message, inclusive of the confidential portions. In 202 the message is being copied to Jonathan, with the 'C:' symbolizing the full-access level of that recipient. In 203 the message is being blind carbon copied to Ariel, but the 'NC:' notes that Ariel does not have access to the confidential portions of the message. Module 204 notes the beginning of a confidential phrase with 205 denoting the end of the very same confidential phrase that will be visible only to Alex and Jonathan. Module 206 through 207 denotes the not confidential material that will be visible to all of the recipients of the message. It is also possible to leave out the [NC: through :NC], seeing as all of the recipients will be allowed to view this portion of the document/message anyway. Module 208-209 were explained as module 104 and 105 in FIG. 1. This principle may be utilized in a more general display of text, as will be explained in a later figure.

Figure 3:
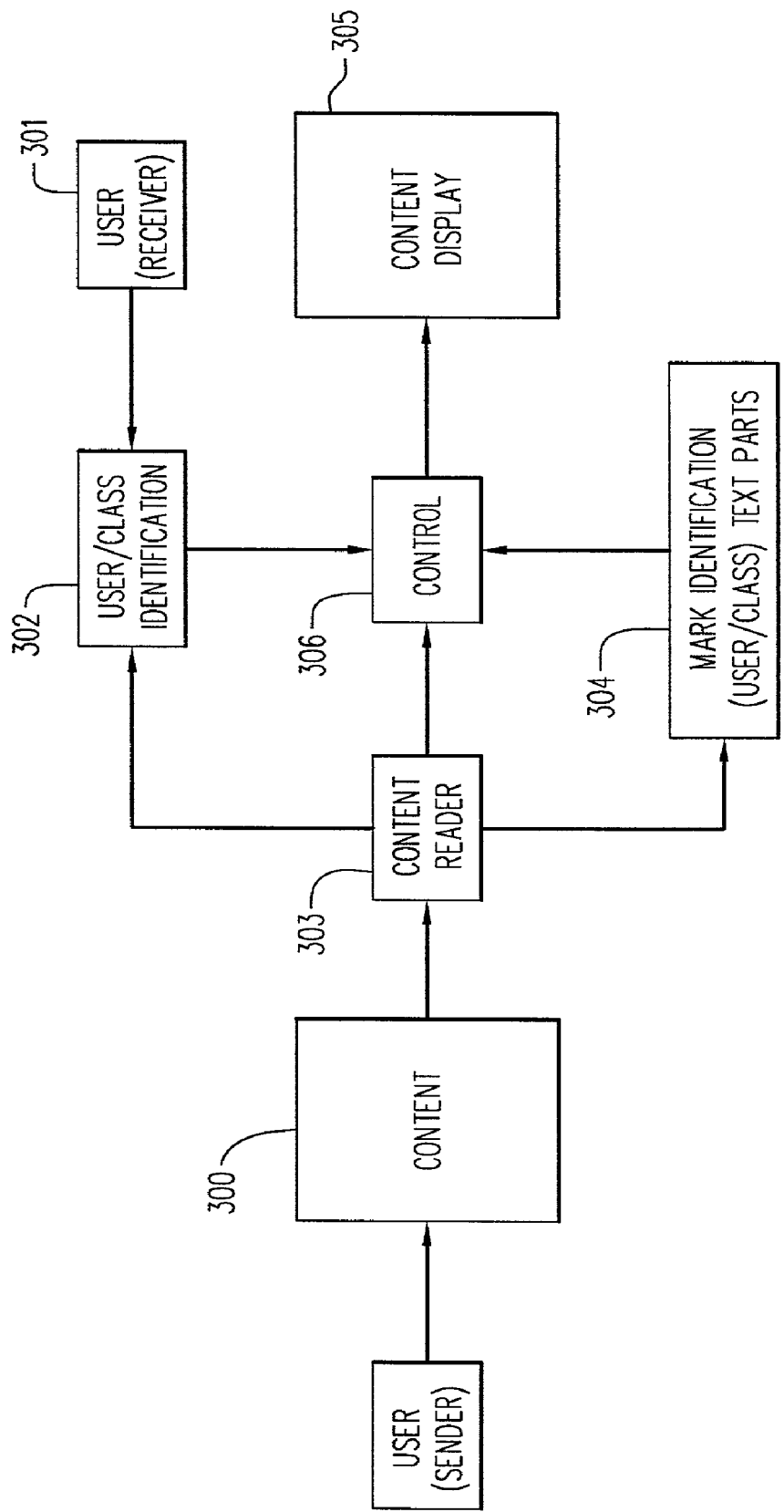
FIG. 3 is a general block diagram of the invention

FIG. 3 is a general block scheme that depicts how the invention works with a user (receiver) module 301. The user receives a message 300. This message is read by the content reader 303. The content reader checks to see if the user's name is in the message, and identifies the content according to marks or flags within the document 304; for example, if there are confidential information marks meant only for particular users. This information enters the control module 306 and the content display module 305. Module 302 identifies the user reading the email message, or identifies the class of the user reading the e-mail message. For example, the user-Id of the person may be what is used for identification, or biometrics may be another possibility for identification. The biometrics identification may be done according to methods described in the aforenoted patent application: Method For User Recognition Employing Behavioral Passwords.

The mark identification 304 also enters the control module 306 along with the class of the subject matter in the portion of text-for user and class characteristics (confidential vs. not-confidential). The control module 306 checks how the identified marks correlate with the permission level of the particular user intending to read the document/e-mail message. Only the approved portions of the document that apply to the security level of that user are sent to the content display module 305, and are visible to the user. Fonts may also be specified differently for different users/receivers.

Figure 4:
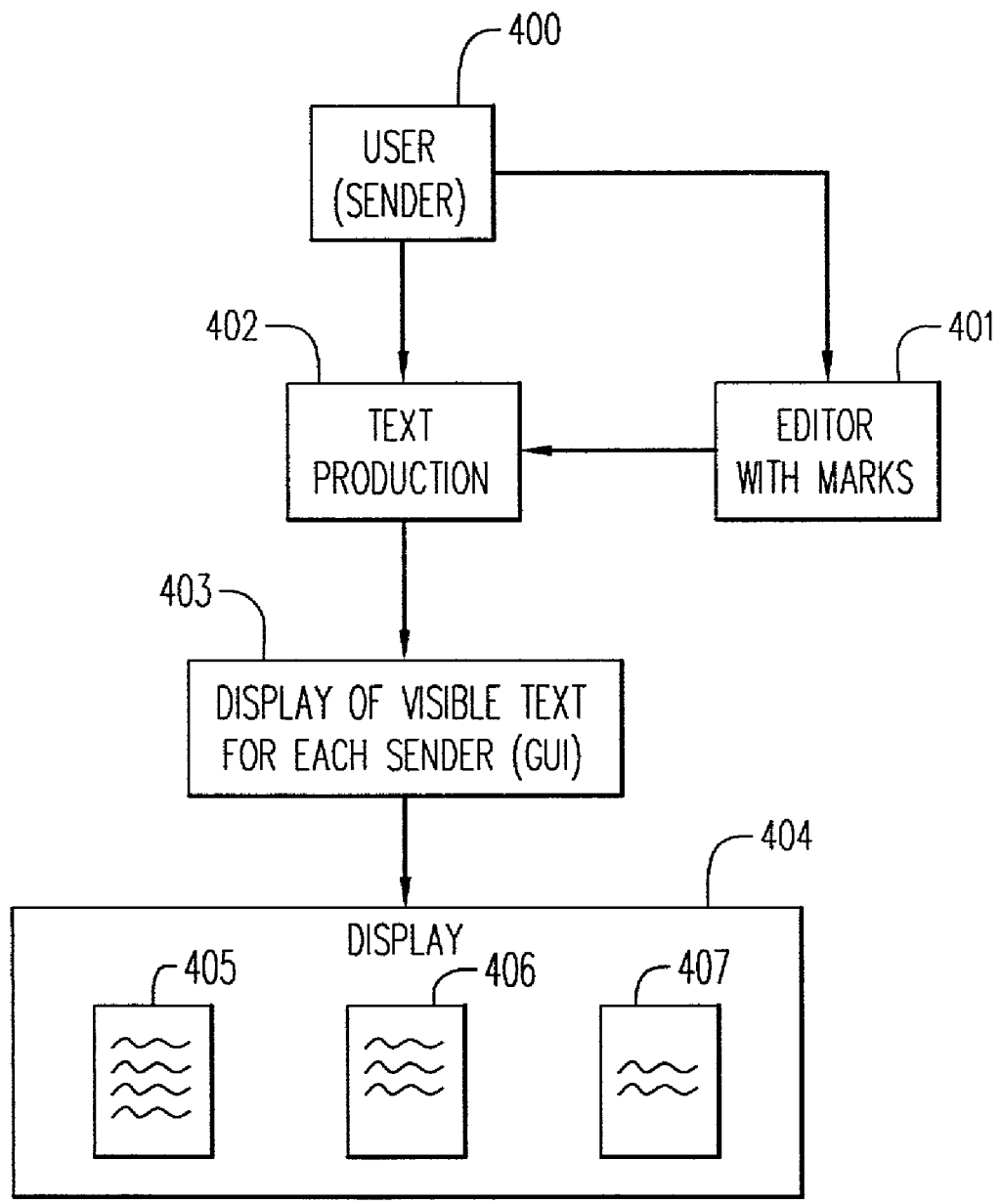
FIG. 4 depicts some elements of a user interface

In FIG. 4, user 400 (sender) is preparing a text, in the text production module 402(keyboard, speech recognition, or handwriting recognition). The user 400 also utilizes an editor with markers 401 that allows a user to flag/note portions of the text that are intended to be read by different recipients. Module 403 allows the user to preview on their own display how the different users will see the document on their computers. Module 404 represents the display with different copies of the same text, how they would be seen by different users—for example, 405, 406, and 407 represent how the document will be seen differently by different users.

Figure 5:
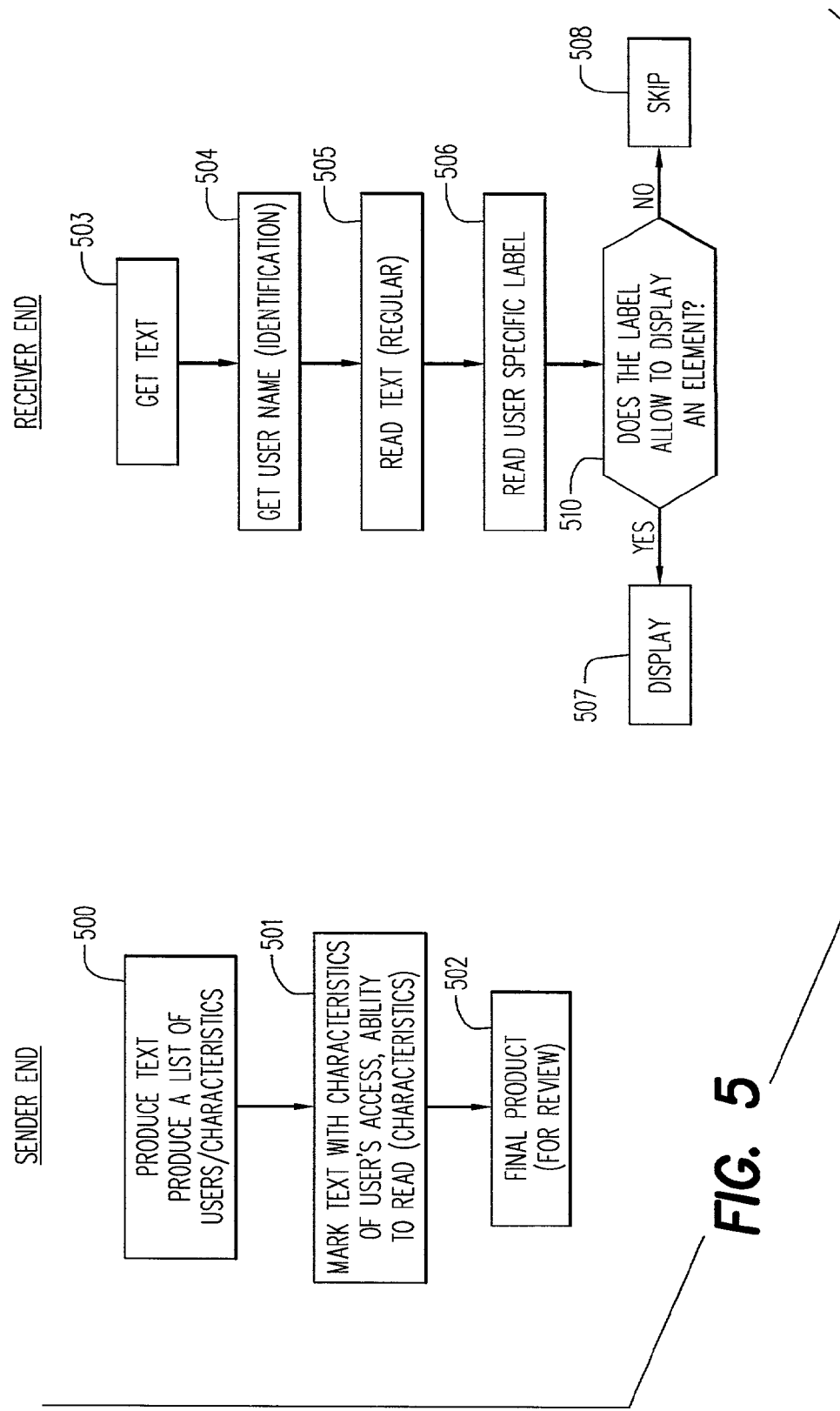
FIG. 5 is a flow chart of the invention

FIG. 5 is a flow chart of the invention methodology. The first column represents the process from the sender's end. The sender produces text with a list of users/characteristics for the receiver/reader 500. Module 501 shows the sender marking the text with characteristics of users that are allowed to read the document. In module 502 the visible texts for all users are displayed as a preview for the sender to verify what every user may read. The second column shows the process from the side of the receiver. The receiver gets the text in module 503. Module 504 gets the user's name since the user needs to identify itself. Module 505 reads the text. Module 506 reads the labels/marks. Module 510 checks that the label allows the program to display the given part of the document. If yes, 507 displays the text on the receivers screen. If no, 508 the program skips the portion and moves on to the next label.

The invention having been thus described with particular reference to the preferred forms thereof, it will be obvious that various changes and modifications may be made therein without departing from the spirit and scope of the invention as defined in the appended claims.

What is claimed is

1. A process performed by a computer system for enabling the transmission of a prepared message, wherein information contained in the prepared message includes common portions intended for viewing by all recipients and one or more unique portions for viewing by selected ones of the recipients, comprising the steps of:

composing the prepared message, including both the prepared message information and instructions for the one or more unique portions to selected recipients;

assigning each of the one or more unique portions a respective portion access level, wherein the instructions restrict each of the one or more unique portions to be viewed only by one or more of the selected recipients having respective recipient access levels that are equal to or higher than the respective portion access level of the one or more unique portions, wherein the highest access level provides access to an entirety of the message;

transmitting together the instructions, the common portions and all of the one or more unique portions with the respective portion access levels of the prepared message information to all the recipients; and each of said recipients receiving all of the prepared message and determining a recipient access level of the recipient based on information of said recipient and using said instructions to correlate said recipient access level with said portion access levels of said received message and then to present for viewing by said recipient the common portion and only the one or more unique portions, for which the recipient access level is equal to or greater than the portion access level, wherein at least one or more of said recipients are restricted from viewing at least one or more portions of said one or more unique portions.

2. A process as defined in claim 1, further comprising the step of receiving information from one or more of the selected recipients and determining the recipient access levels of the one or more selected recipients based on the information.

3. A process as defined in claim 1, wherein the messages are selected from the group consisting of: textual or visual information, sound information, and any combination thereof.

4. A process as defined in claim 1, further comprising the step of presenting a view of the entire message.

5. A process as defined in claim 1, wherein said portion access level and said recipient access level are selected from the group consisting of a security level, a level of interest, a level of expertise, a detail level, and any combinations thereof.

6. A system for sending and receiving prepared messages that are sent to multiple intended recipients, wherein information contained in the message includes common portions intended for viewing by all the recipients and one or more unique portions for viewing by selected ones of the recipients, said system comprising:

a sender facility that comprises:
a module containing an entirety of the prepared message, which includes both the common and unique portions and instructions for selectively providing the one or more unique portions to the selected recipients, wherein the one or more unique portions are each assigned a respective portion access level, wherein the highest access level provides access to an entirety of the message, wherein the instructions and both the common portions and the one or more unique portions with the respective portion access levels are stored for transmission to all of the recipients, and wherein the instructions restrict the viewing of a particular one of the one or more unique portions to only one or more of the recipients having a recipient access level that is equal to or higher than the respective portion access level of the particular unique portion; and each of the intended recipients comprising a reception facility that comprises:
a module that reads all of said prepared message that includes the instructions and both the common portions and the one or more unique portions with the respective portion access levels to all of the recipients; and a module that receives information entered by a recipient, determines a recipient access level of the recipient based on said information and using said instructions correlates said recipient access level with said portion access levels of said received message and presents for viewing by said recipient the common portion and only the one or more unique portions, for which the recipient access level is equal to or greater than the portion access level, wherein at least one or more of said intended recipients are restricted from viewing at least one or more portions of said one or more unique portions.

7. A system as defined in claim 6, further comprising:
a dialogue module including an input to allow the one or more recipients to enter information for determining the respective recipient access levels of the one or more recipients, wherein the respective recipient access levels are based on said information.

8. A system as defined in claim 6, wherein the messages are selected from the group consisting of: textual or visual information, sound information, and a combination thereof.

9. A system as defined in claim 6, including means for enabling at least two views of the message to a composer thereof, wherein a first view includes a view of the entirety of the message, and a second view includes a view of the message as the message would be viewed by a particular selected recipient.

10. A system as defined in claim 6, wherein a closing of the message differs for each different recipient.

11. A system as defined in claim 6, wherein confidential parts are viewable only to certain recipients and are not viewable by other recipients.

12. A system as defined in claim 6, further including biometric means for determining an identity or the recipient access level of each of the one or more recipients so as to confirm what level of textual or visual data can be displayed for the one or more recipients.

13. A system as defined in claim 6, further comprising a graphical user interface that permits recipients to view how different recipients would see the prepared message.

14. A system as defined in claim 6, further comprising:
biometrics for identifying a recipient; and
a dialogue module including an input to allow a particular recipient to enter information for determining a recipient access level of the particular recipient,
wherein the recipient access level of the particular recipient is determined from the biometrics and the information so as to confirm what level of the one or more unique portions can be displayed for the particular recipient.

15. A system as defined in claim 6, wherein said portion access level and said recipient access level are selected from the group consisting of a security level, a level of interest, a level of expertise, a detail level, and any combinations thereof.

16. A system as defined in claim 6, wherein said portion access level and said recipient access level are selected from the group consisting of a security level, a level of interest, a level of expertise, a detail level, and any combinations thereof.

* * * * *